United States Patent
Chae et al.

(10) Patent No.: US 9,193,378 B2
(45) Date of Patent: *Nov. 24, 2015

(54) ELECTRIC POWER STEERING APPARATUS FOR VEHICLE

(71) Applicant: MANDO CORPORATION, Pyeongtaek-si, Gyeonggi-do (KR)

(72) Inventors: Han Sang Chae, Seongnam-si (KR); Seong Ho Choi, Anyang-si (KR); Jung Sik Park, Seongnam-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,705

(22) Filed: May 30, 2014

(65) Prior Publication Data

US 2014/0353069 A1    Dec. 4, 2014

(30) Foreign Application Priority Data

May 30, 2013  (KR) .................. 10-2013-0061777

(51) Int. Cl.
  *B62D 5/04*    (2006.01)
  *B62D 3/12*    (2006.01)

(52) U.S. Cl.
  CPC ............. *B62D 5/0421* (2013.01); *B62D 3/12* (2013.01); *B62D 5/0415* (2013.01)

(58) Field of Classification Search
  CPC .......................... B62D 5/0421; B62D 5/0403
  See application file for complete search history.

(56) References Cited

U.S. PATENT DOCUMENTS

| | | | | |
|---|---|---|---|---|
| 6,039,143 A | * | 3/2000 | Kielar et al. | 180/412 |
| 2012/0329592 A1 | * | 12/2012 | Sun et al. | 475/4 |
| 2014/0353065 A1 | * | 12/2014 | Chae | 180/444 |

FOREIGN PATENT DOCUMENTS

| | | |
|---|---|---|
| JP | 1999-105719 A | 4/1999 |
| JP | 2004-001626 A | 1/2004 |

* cited by examiner

*Primary Examiner* — Kevin Hurley
(74) *Attorney, Agent, or Firm* — McDermott Will & Emery LLP

(57) ABSTRACT

Disclosed is an electric power steering apparatus for a vehicle. The electric power steering apparatus for a vehicle has a structure in which a motor shaft, an input shaft, a pinion shaft, and the like are coaxially disposed to improve a structure of a conventional art in which an electric motor is essentially exposed, so as to prevent interference with other structures, thereby forming a layout of the steering apparatus to be compact.

7 Claims, 7 Drawing Sheets

ELECTRIC POWER STEERING APPARATUS FOR VEHICLE

CROSS-REFERENCE TO RELATED APPLICATION

This application claims the priority under 35 U.S.C. §119 (a) to Korean Application Serial No. 10-2013-0061777, which was filed in the Korean Intellectual Property Office on May 30, 2013, the entire content of which is hereby incorporated by reference.

BACKGROUND OF THE INVENTION

1. Field of the Invention

The present invention relates to an electric power steering apparatus for a vehicle, and more particularly to an electric power steering apparatus for a vehicle, which has a structure in which a motor shaft, an input shaft, a pinion shaft, and the like are coaxially disposed and improves a structure of a conventional art in which an electric motor is essentially exposed to prevent interference with other structures, thereby forming a layout structure of the steering apparatus to be compact.

2. Description of the Related Art

FIG. 1 is a view illustrating a structure of a conventional electric power steering apparatus.

As shown in FIG. 1, the conventional electric power steering apparatus 100 for a vehicle includes a steering system extending from a steering wheel 101 to both wheels 108, and an auxiliary power mechanism 120 for supplying an auxiliary steering force to the steering system.

The steering system includes a steering shaft 102 having one end thereof connected to the steering wheel 101 and the other end thereof connected to a driving shaft by means of a universal joint 103.

The driving shaft includes an input shaft 104 connected to the steering shaft 102, and a pinion shaft 106 which is connected to the input shaft 104 by means of a torsion bar (not shown) and has a pinion gear 111 mounted on a lower end thereof.

The pinion gear 111 mounted on the pinion shaft 106 is tooth-engaged with a rack gear 112 formed on an outer peripheral surface of a rack bar 109, and the rack bar 109 has both ends connected to wheels 108 of the vehicle through tie rods 151 and knuckle arms 153, respectively.

The auxiliary power mechanism 120 includes a torque sensor 125 for detecting a torque generated at the input shaft 104 and outputting an electric signal proportional to the detected torque as a driver rotates the steering wheel 101, an electric control unit 123 for generating a control signal based on the electric signal transmitted from the torque sensor 125, an electric motor 130 for generating an auxiliary power based on the control signal transferred from the electric control unit 123, and worm 141 and worm wheel 143 for transferring an auxiliary power from the electric motor 130 to the pinion shaft 106.

However, in the conventional electric power steering apparatus for the vehicle, the electric motor, the worm, the worm wheel, and the like are used to construct a reducer of the auxiliary power mechanism 120. In this structure, the electric motor is essentially exposed when they are mounted on the vehicle, and causes interference with other structures. Accordingly, there is a disadvantageous in the layout.

SUMMARY OF THE INVENTION

The present invention has been developed to solve the above-mentioned problems in the conventional art, and an aspect of the present invention is to provide an electric power steering apparatus for a vehicle, which has a structure in that a motor shaft, an input shaft, a pinion shaft, and the like are coaxially disposed to improve a structure of a conventional art in which an electric motor is essentially exposed, so as to prevent interference with other structures, thereby forming a layout structure of the steering apparatus to be compact.

The aspect of the present invention is not limited thereto, and other aspects of the present invention will be apparently understood by those skilled in the art through the below description.

In accordance with an aspect of the present invention, an electric power steering apparatus is provided. The electric power steering apparatus includes: an electric motor supported on an inner peripheral surface of a housing, having a hollow shape, and including a sun gear mounted on an outer peripheral surface of one end; a planetary gear assembly which includes a plurality of first planetary gears internally engaged with a first ring gear fitted in the housing, a plurality of second planetary gears connected to the plurality of first planetary gears by a connection shaft respectively, and internally engaged with a second ring gear, and a carrier to which both ends of the connection shaft are coupled and supported; and, a pinion shaft extending through the motor shaft, and having one end thereof on an outer peripheral surface of which a pinion gear is mounted to be engaged with a rack gear formed on a rack bar, and the other end thereof which is connected to the input shaft by means of the torsion bar, the pinion shaft being connected to the second ring gear.

According to the embodiment of the present invention, an electric power steering apparatus for a vehicle has a structure in that a motor shaft, an input shaft, a pinion shaft, and the like are coaxially disposed to improve a structure of a conventional art in which an electric motor is essentially exposed, so as to prevent interference with other structures, thereby forming a layout structure of the steering apparatus to be compact.

BRIEF DESCRIPTION OF DRAWINGS

The above and other aspects, features, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the exemplary drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 1:
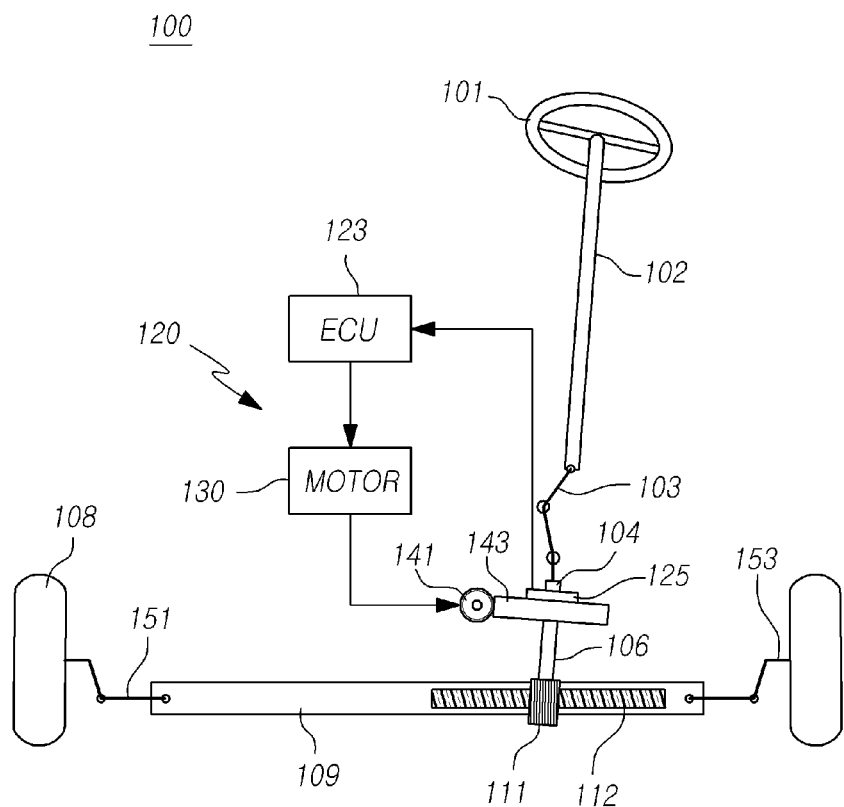
FIG. 1 is a view illustrating a structure of a conventional electric power steering apparatus.
Figure 2:
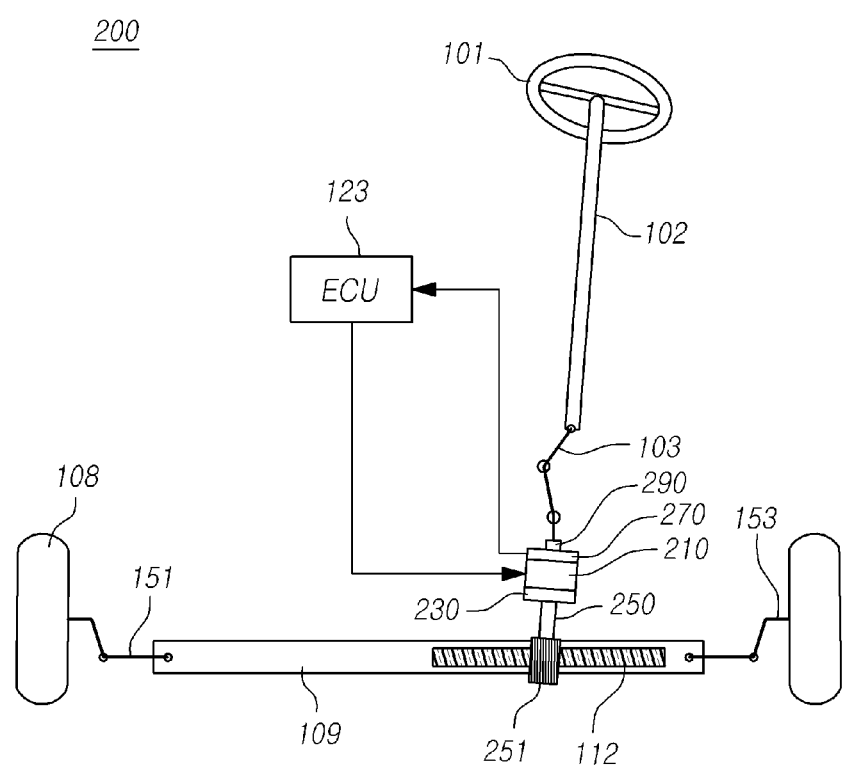
FIG. 2 is a view illustrating a structure of an electric power steering apparatus for a vehicle according to an embodiment of the present invention.
Figure 3:
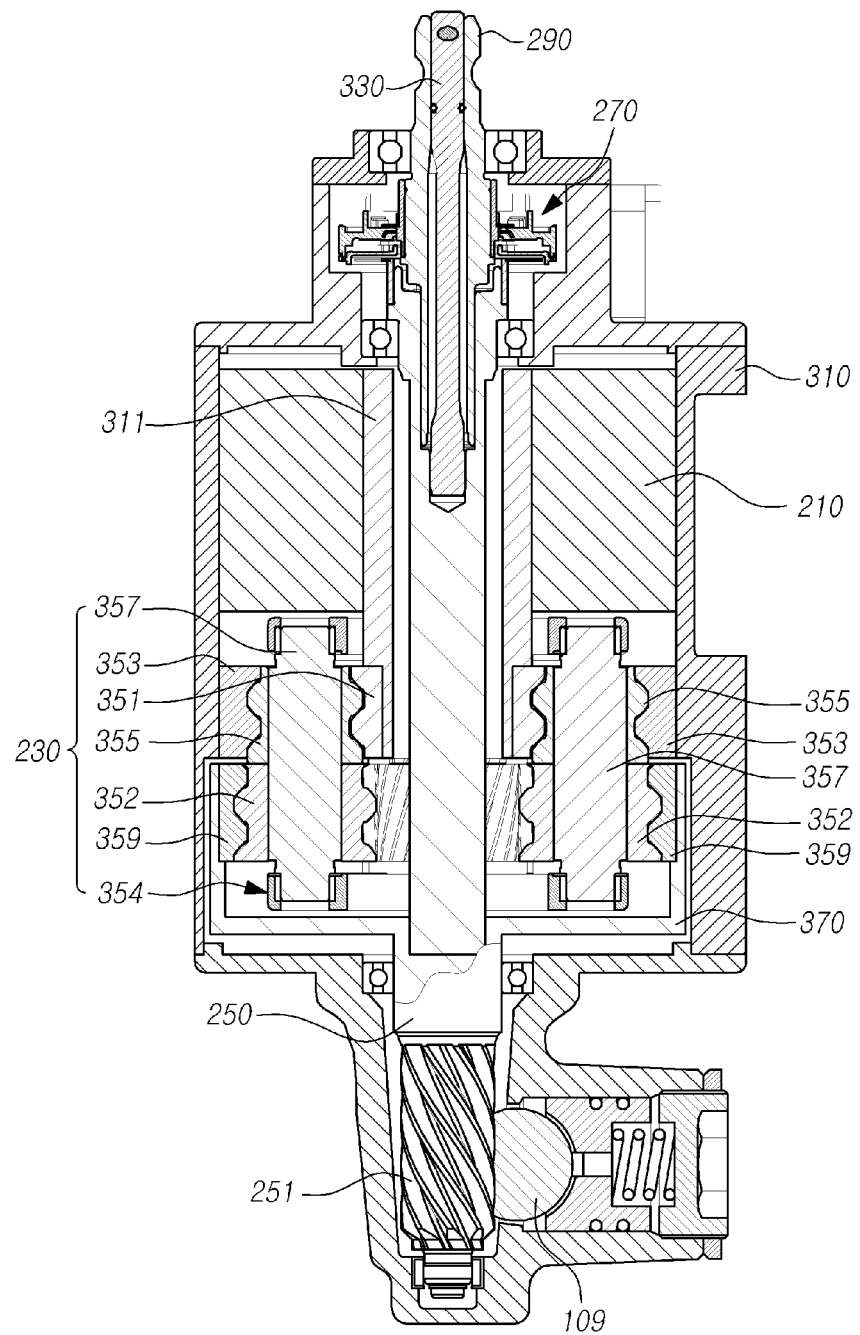
FIG. 3 is a sectional view partially illustrating the electric power steering apparatus of FIG. 2.
Figure 4:
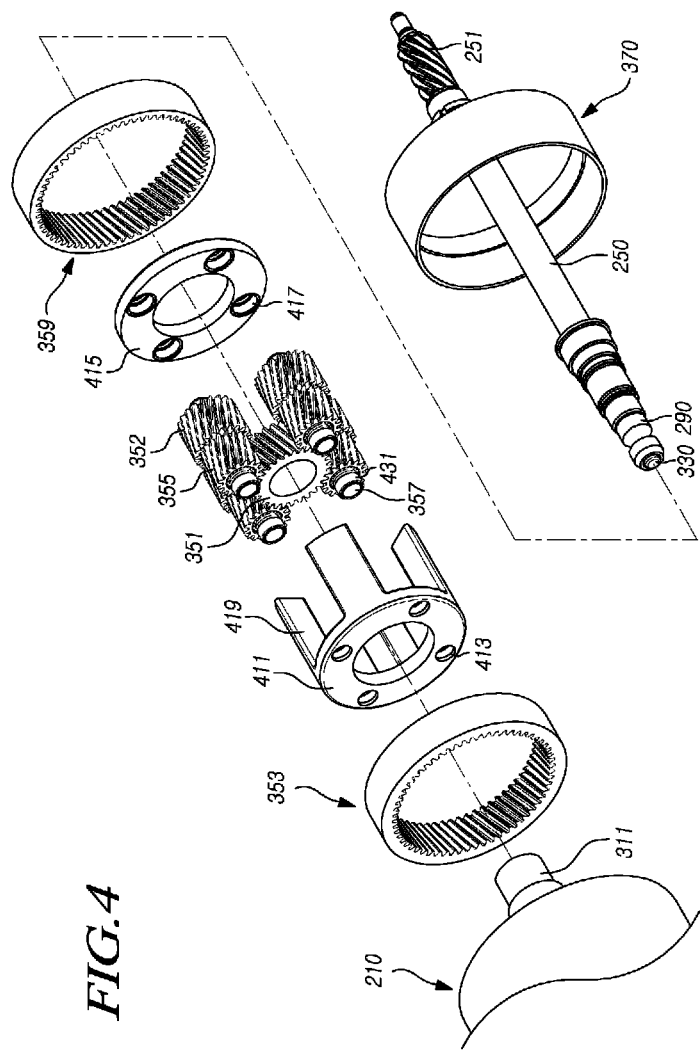
FIG. 4 is an exploded perspective view partially illustrating the electric power steering apparatus of FIG. 3.
Figure 5:
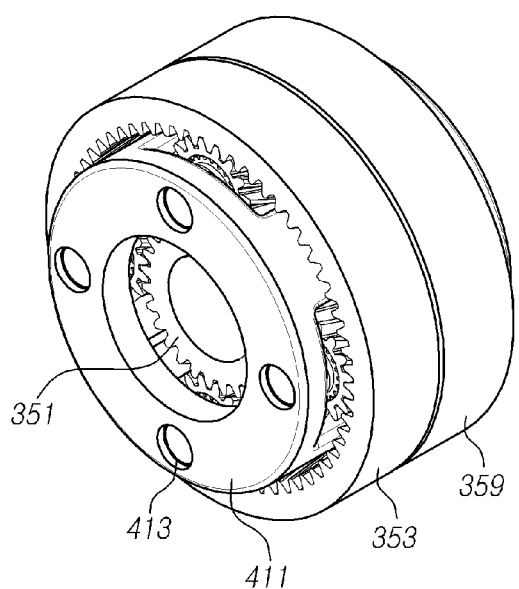
FIG. 5 is a perspective view illustrating a planetary gear assembly of FIG. 3.
Figure 6:
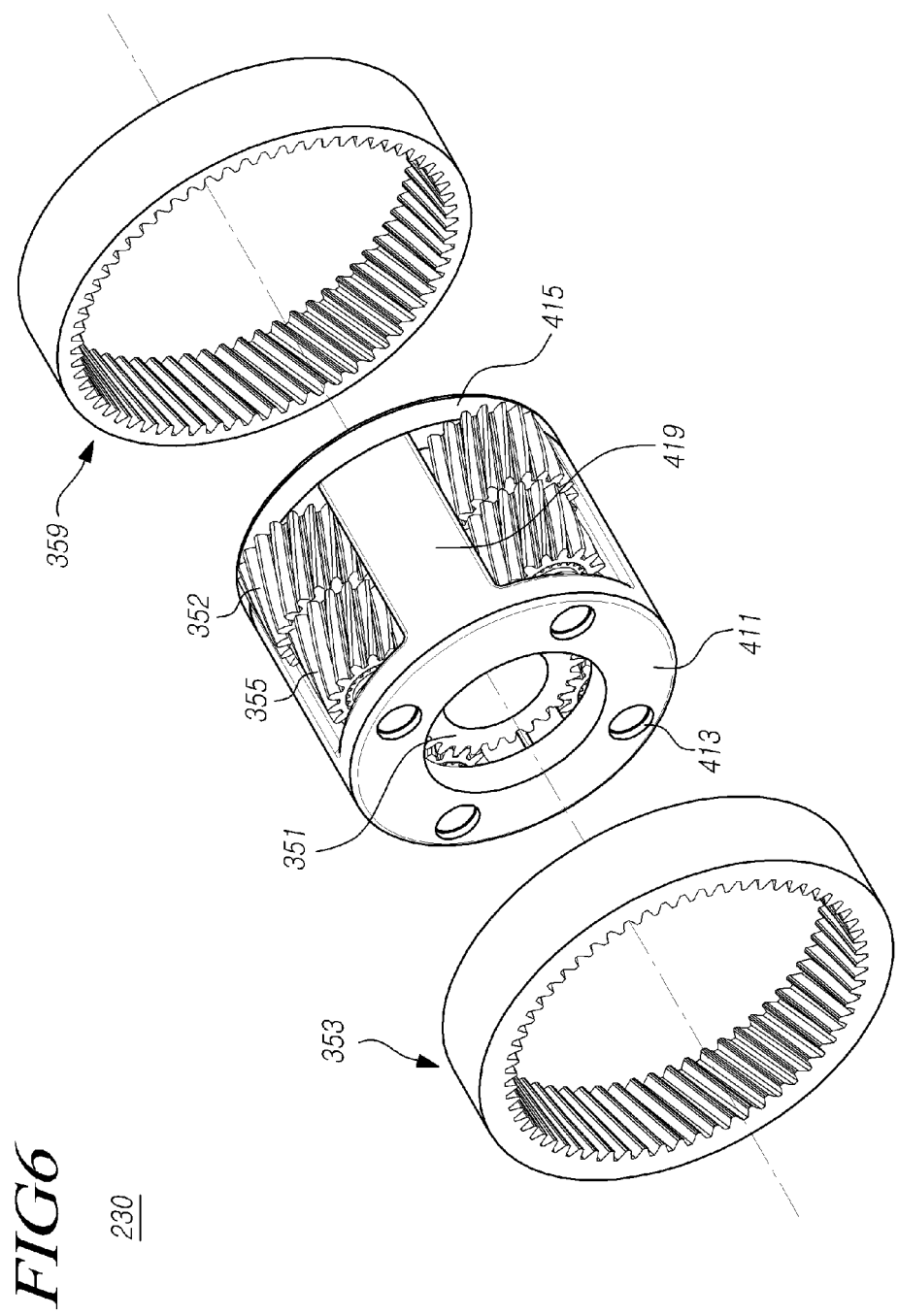
FIG. 6 is an exploded perspective view illustrating the planetary gear assembly of FIG. 5.
Figure 7:
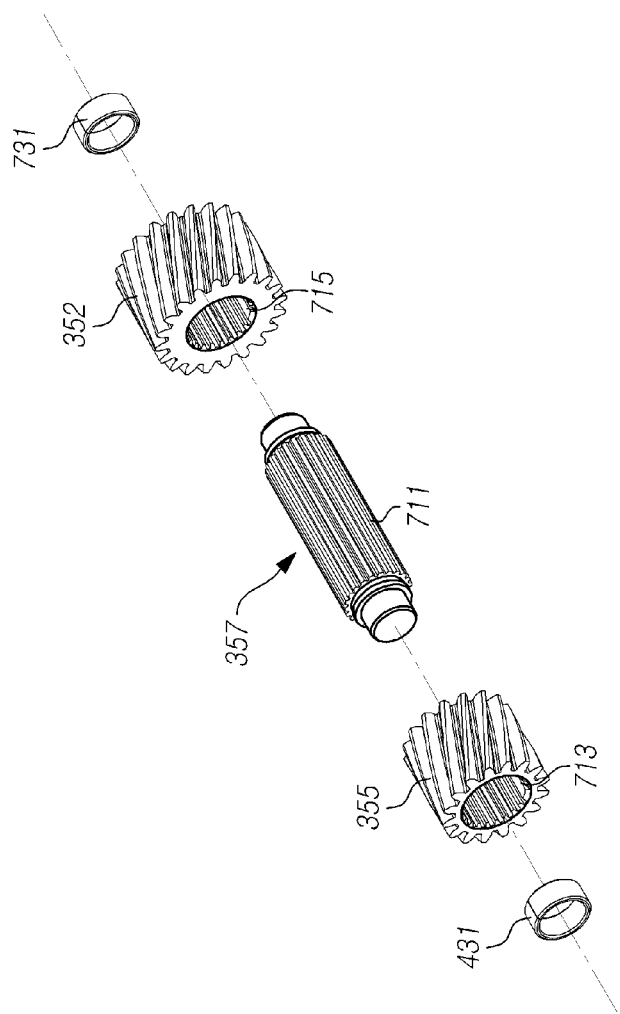
FIG. 7 is an exploded perspective view illustrating a connection shaft and first and second planetary gears of FIG. 4.

FIG. 2 is a view illustrating a structure of an electric power steering apparatus for a vehicle according to an embodiment of the present invention. FIG. 3 is a sectional view partially illustrating the electric power steering apparatus of FIG. 2. FIG. 4 is an exploded perspective view partially illustrating the electric power steering apparatus of FIG. 3. FIG. 5 is a perspective view illustrating a planetary gear assembly of FIG. 3. FIG. 6 is an exploded perspective view illustrating the planetary gear assembly of FIG. 5. FIG. 7 is an exploded perspective view illustrating a connection shaft and first and second planetary gears of FIG. 4.

As shown in the drawings, the electric power steering apparatus 200 for the vehicle according to the embodiment of the present invention includes: an electric motor 210 supported on an inner peripheral surface of a housing 310 and having a hollow motor shaft 311 on an outer peripheral surface of one end which a sun gear 351 is mounted; a planetary gear assembly which has a plurality of first planetary gears 355 which is externally engaged with the sun gear 351 and internally engaged with a first ring gear 353 fitted in the housing 310, a plurality of second planetary gears 352 connected to the first planetary gears 355 by connection shafts 357 respectively and internally engaged with a second ring gear 359, and a carrier 354 for supporting both ends of the connection shaft 357; and, a pinion shaft 250 which extends through the motor shaft 311, has one end thereof on which a pinion gear 251 is mounted and engaged with a rack gear 112 formed on a rack bar 109 and the other end thereof, which is connected to the input shaft 290 by means of a torsion bar 330, and is connected to the second ring gear 359.

The input shaft 290 is connected to a steering shaft 102 by means of a universal joint 103, and the steering shaft 102 is connected to a steering wheel 101. Thus, the steering shaft 102 and the input shaft 290 are associated with each other and rotate together as the steering wheel 101 rotates.

The electric motor 210 is supported on an inner peripheral surface of the housing 310, which has the motor shaft 311 with a hollow shape, and the sun gear 351 integrally mounted on the inner peripheral surface of one end of the motor shaft 311.

On the other hand, the electric motor 210 generates an auxiliary power based on a control signal transferred from an electric control unit (ECU) 123, which rotates the sun gear 351 through the motor shaft 311 by using the auxiliary power.

Further, the motor 210 is provided with the input shaft 290 and the pinion shaft 250 described later which are mounted on an upper portion thereof, and a torque sensor 270 for measuring a value of torque applied to the input shaft 290, and the torque value of the input shaft 290 measured by the torque sensor 270 is converted into an electric signal and transferred to the ECU 123, so as to control the electric motor 210.

The planetary gear assembly 230 includes a plurality of first planetary gears 355, a plurality of second planetary gears 352, a first ring gear 353, a second ring gear 359, and a carrier 354.

The first planetary gears 355 are disposed between the sun gear 351 and the first ring gear 353, and externally engaged with the sun gear 351 while internally engaged with the first ring gear 353. The first ring gear 353 is fitted in the housing 310.

Accordingly, when the sun gear 351 mounted on the motor shaft 311 is rotated by the auxiliary power provided from the electric motor 210, the first planetary gears 355 externally engaged with the sun gear 351 rotates and revolve around the sun gear 351 between the sun gear 351 and the first ring gear 353.

The second planetary gears 352 are connected to the first planetary gears 355 by the connection shaft 357 respectively. The connection shaft 357 and the first and second planetary gears 352 are coupled to one another in such a manner that a first serration portion 711 is axially formed on an outer peripheral surface of the connection shaft 357, a second serration portion 713 is formed on an inner peripheral surface of each of the plurality of first planetary gears 355, and a third serration portion 715 is formed on an inner peripheral surface of each of the plurality of second planetary gears 352, so that the first planetary gears 355 and the second planetary gears 352 may be coupled to the connection shaft 357 by the serration.

On the other hand, the second planetary gear 352 is internally engaged with the second ring gear 359. Since the first planetary gears 355 rotate and revolve as described above, the second planetary gears 352 also rotate and revolve. Accordingly, as the second ring gear 359 rotates, the pinion shaft 250 connected to the second ring gear 359 by means of a connection body 370 and described later is rotated by the auxiliary power provided by the electric motor 210.

Here, the second ring gear 359 is integrally fitted in the connection body 370 having a hollow cylindrical shape, so that a rotation force of the second ring gear 359 is transferred to the pinion shaft 250 through the connection body 370.

Both ends of the connection shaft 357 are coupled to and supported by the carrier 354. The structure of the carrier 354 will be described in detail. The carrier 354 includes: a first supporting portion 411 having an annular shape and a first hole 413 in which one end of the connection shaft 357 is inserted; a second supporting portion 415 having an annular shape and a second hole 417 which is opposite to the first hole 413 and in which the other end of the connection shaft 357 is inserted; and, a connection portion 419 which connects the first supporting portion 411 with the second supporting portion 415 and supports the first supporting portion 411 and the second supporting portion 415.

The first supporting portion 411 may be made of an annular plate. Since the first hole 413 is formed in the first supporting portion 411, one end of the connection shaft 357 is inserted in and coupled to the first hole 413.

The second supporting portion 415 may be also made of an annular plate. Since the second hole 417 is formed in the second supporting portion 415, the other end of the connection shaft 357 is inserted in and coupled to the second hole 417.

The connection portion 419 connects the first supporting portion 411 with the second supporting portion 415, which may be integrally formed on the supporting portion 411 or the second supporting portion 415.

That is, as the connection portion 419 is integrally formed on the first supporting portion 411, the connection portion 419 and the first supporting portion 411 may be formed to be one structure. In the drawings, the one structure is shown.

Of course, alternatively, the connection portion 419 may be integrally formed on the second supporting portion 415 so that the second supporting portion 415 and the connection portion 419 construct one structure.

As described above, since the connection portion 419 is integrally formed on the first supporting portion 411 or the second supporting portion 415, a management of parts is convenient, and the planetary gears 352 and 355 and the carrier 354 may be easily assembled and separated.

On the other hand, a first bearing 431 is mounted on an outer peripheral surface of one end of the connection shaft 357 and may be press-fitted in the first hole 413, while a second bearing 731 is mounted on an outer peripheral surface of the other one of the connection shaft 357 and may be press-fitted in the second hole 417.

The pinion shaft 250 extends through the motor shaft 311, and has one end thereof on which a pinion gear 251 is formed to be engaged with the rack gear 112 formed on the rack bar 109, and the other end thereof connected to the input shaft 290 by the torsion bar 330.

Further, the pinion shaft 311 is connected to the second ring gear 359 through the connection body 370, and thus rotates along with the second ring gear 359.

Hereinafter, an operation of the electric power steering apparatus for the vehicle according to the embodiment of the present invention will be described with reference to the drawings.

When the driver rotates the steering wheel 101, the steering shaft 102 and the input shaft 290 connected to the steering shaft 102 by means of the universal joint 103 rotate. In turn, the pinion shaft 250 connected to the input shaft 290 by means of the torsion bar 330 rotates, so that the rotation force of the steering wheel 101 is transferred as a driving force to enable the rack bar 109 to straightly move left and right.

The torque value of the input shaft 290 is measured by the torque sensor 270, and the measured torque value is converted into an electric signal and transmitted to the ECU 123.

On the other hand, the ECU 123 controls the electric motor 210 to generate the auxiliary power, based on an electric signal transmitted from the torque sensor 270 and electric signals transmitted from various sensors, and the generated auxiliary power rotates the motor shaft 311, resulting in the rotation of the sun gear 351.

Then, when the sun gear 351 rotates, the first planetary gears 355 interposed between the sun gear 351 and the first ring gear 353 rotate and revolve while the second planetary gears 352 connected to the first planetary gears 355 by the connection shaft 357 also rotate and revolve. Accordingly, the second ring gear 359, engaged with the second planetary gears 352, rotates to enable the pinion shaft 250 connected to the second ring gear 359 by means of the connection body 370 to rotate. As a result, the auxiliary power of the electric motor 210 is transferred to the pinion shaft 250 so as to assist the steering force of the driver.

As described above, according to the embodiment of the present invention, an electric power steering apparatus for a vehicle has a structure in that a motor shaft, an input shaft, a pinion shaft, and the like are coaxially disposed to improve a structure of a conventional art in which an electric motor is essentially exposed, so as to prevent interference with other structures, thereby forming a layout structure of the steering apparatus to be compact.

Even if it was described above that all of the components of an embodiment of the present invention are coupled as a single unit or coupled to be operated as a single unit, the present invention is not necessarily limited to such an embodiment. At least two elements of all structural elements may be selectively joined and operate without departing from the scope of the present invention. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

DESCRIPTION OF REFERENCE NUMERALS

109: rack bar
112: rack gear
210: electric motor
230: planetary gear assembly
250: pinion shaft
251: pinion gear
290: input shaft
310: housing
311: motor shaft
330: torsion bar
351: sun gear
352: second planetary gear
353: first ring gear
354: carrier
355: first planetary gear
357: connection shaft
359: second ring gear

What is claimed is:

1. An electric power steering apparatus, comprising:
an electric motor supported on an inner peripheral surface of a housing, having a hollow shape, and including a sun gear mounted on an outer peripheral surface of one end;
a planetary gear assembly which includes a plurality of first planetary gears internally engaged with a first ring gear fitted in the housing, a plurality of second planetary gears connected to the plurality of first planetary gears by a connection shaft respectively, and internally engaged with a second ring gear, and a carrier to which both ends of the connection shaft are coupled and supported; and
a pinion shaft which extends through the motor shaft, and has one end thereof on an outer peripheral surface of which a pinion gear is mounted to be engaged with a rack gear formed on a rack bar, and the other end thereof which is connected to the input shaft by means of the torsion bar, the pinion shaft being connected to the second ring gear.

2. The electric power steering apparatus as claimed in claim 1, further comprising a torque sensor mounted on an upper portion of the electric motor and connected to the input shaft and the pinion shaft, so as to measure a value of torque applied to the input shaft, as the steering wheel is operated.

3. The electronic power steering apparatus as claimed in claim 2, wherein the carrier comprises:
a first supporting portion having an annular shape and a first hole in which one end of the connection shaft is inserted and coupled;
a second supporting portion having an annular shape, and a second hole which is formed to be opposite to the first hole and in which the other end of the connection shaft is inserted and coupled; and
a connection portion for connecting the first supporting portion with the second supporting portion and supporting the first and second supporting portions.

4. The electric power steering apparatus as claimed in claim 2, wherein a first serration portion is axially formed on an outer peripheral surface of the connection shaft, a second serration portion is formed on an inner peripheral surface of the plurality of first planetary gears to correspond to the first serration portion, and a third serration portion corresponding to the first serration portion is formed on an inner peripheral surface of the plurality of second planetary gears, so that the plurality of first planetary gears and the plurality of second planetary gears are connected to the connection shaft by the serrations.

5. The electric power steering apparatus as claimed in claim 4, further comprising: a first bearing mounted on an outer peripheral surface of one end of the connection shaft, and a second bearing mounted on an outer peripheral surface of the other end of the connection shaft.

6. The electric power steering apparatus as claimed in claim 3, wherein the connection portion is integrally formed on the first supporting portion or the second supporting portion.

7. The electric power steering apparatus as claimed in claim 3, wherein a first serration portion is axially formed on an outer peripheral surface of the connection shaft, a second serration portion is formed on an inner peripheral surface of the plurality of first planetary gears to correspond to the first serration portion, and a third serration portion corresponding to the first serration portion is formed on an inner peripheral surface of the plurality of second planetary gears, so that the plurality of first planetary gears and the plurality of second planetary gears are connected to the connection shaft by the serrations.

\* \* \* \* \*